(12) United States Patent
Nishibori et al.

(10) Patent No.: US 7,087,161 B1
(45) Date of Patent: Aug. 8, 2006

(54) RESIN CULTIVATING BASE, WATER PURIFYING DEVICE AND METHOD USING RESIN CULTIVATING BASE

(76) Inventors: Sadao Nishibori, No. 1-9-206, Higashi-Shinagawa, 1-chome, Shinagawa-ku, Tokyo (JP); Takeyasu Kikuchi, No. 7-12-604, Mita, 5-chome, Minato-ku, Tokyo (JP); Maki Shirai, Suncity Mizutani B201, No. 2-25-1, Goudo, Gifu-shi, Gifu (JP); Yuichiro Nakamura, No. 859, Beppu, Hozumi-cho, Motosu-gun, Gifu (JP); Emi Sasaki, No. 1267-1, Tadakoshi, Hozumi-cho, Motosu-gun, Gifu (JP)

( * ) Notice: Subject to any disclaimer, the term of this patent is extended or adjusted under 35 U.S.C. 154(b) by 1124 days.

(21) Appl. No.: 09/689,831

(22) Filed: Oct. 13, 2000

(30) Foreign Application Priority Data

Dec. 13, 1999 (JP) .......................... 11-353593

(51) Int. Cl.
  *C02F 3/32* (2006.01)
  *A01G 31/02* (2006.01)

(52) U.S. Cl. .................. 210/170; 210/242.1; 210/602; 210/747; 47/60; 47/63; 47/64

(58) Field of Classification Search ............... 210/602, 210/615, 747, 150, 170, 232, 242.1, 903, 210/906; 47/59, 63, 64, 60
See application file for complete search history.

(56) References Cited

U.S. PATENT DOCUMENTS 5,009,031 A * 4/1991 Knop et al.
5,087,400 A * 2/1992 Theuveny
5,309,673 A * 5/1994 Stover et al.
5,702,604 A * 12/1997 Yamasaki et al.
6,086,755 A * 7/2000 Tepper

FOREIGN PATENT DOCUMENTS

DE 19654031 A1 6/1998
DE 19654031 * 6/1998
JP 5-95735 * 4/1993
JP 10-113685 * 5/1998

OTHER PUBLICATIONS

Search Report of EP 00 12 3225.
Patent Abstracts of Japan—vol. 1996, No. 12, Dec. 26, 1996.
Patent Abstracts of Japan—vol. 1999, No. 11, Sep. 30, 1999.
Patent Abstracts of Japan—vol. 1998, No. 6, Apr. 30, 1998.
Patent Abstracts of Japan—vol. 1998, No. 10, Aug. 31, 1998.
Patent Abstracts of Japan—vol. 1998, No. 2, Jan. 30, 1998.

* cited by examiner

*Primary Examiner*—David A. Simmons
*Assistant Examiner*—Fred Prince
(74) *Attorney, Agent, or Firm*—Dennison, Schultz & Dougherty

(57) ABSTRACT

A resin cultivating base serves as seedling beds for vegetation which are planted and are partially immersed in a river, lake, marsh, pond or waterway. The resin cultivating base is a three-dimensional structure constituted by long and short filaments of thermoplastic resin. The long and short filaments are curled or looped at random, and contacted, entwined and gathered, thereby forming a low density portion and a high density portion. Vegetables planted on the low density portion of the resin cultivating base suck nutritious salt such as phosphor and nitride. Microorganisms living in the resin cultivating base decompose organisms in the water, thereby purifying the water.

19 Claims, 13 Drawing Sheets

Array of Resin Cultivating Base Blocks

Riverbed (A)

(B)

RESIN CULTIVATING BASE, WATER PURIFYING DEVICE AND METHOD USING RESIN CULTIVATING BASE

BACKGROUND OF THE INVENTION

1. Field of the Invention

This invention relates to a resin cultivating base on which seedlings of aquatic plants and so on are planted and which is partially immersed in not only a stream, a natural or man-made river, lake and marsh but also in a waterway drawing the water from them and communicating with reservoirs such as water purifying tanks of a sewage disposal plant or the like. In this specification, the stream, river, lake, marsh and waterway will be collectively called the "waterway" hereinafter. Further, the invention relates to a water purifying device which is constituted by the foregoing resin cultivating base where vegetation is planted and raised in order to promote natural purifying capabilities of the waterway, and to a water purifying method.

2. Description of the Related Art

Water pollution has become a serious with waterways. A variety of proposals have been made in order to overcome this problem.

As one method of overcoming water pollution, it is conceivable that water is temporarily drawn from the waterway using a pump, is purified by oxidization resulting from contact with gravel, sand filtering, coagulation filtering, precipitation and so on, and is finally returned to the waterway. However, this method requires a large-scale water purifying plant, and a lot of labor and expense in order to maintain and manage the plant. Recently, various methods are being studied in order to purify water by promoting natural purifying capabilities of a waterway using a relatively simple method.

For promoting said natural purifying capabilities of a waterway, it has been proposed to root aquatic plants in a waterway so that the natural purifying capabilities of the waterway are promoted. Generally speaking, aquatic plants such as reeds usually grow very well in shallows which are 80 cm or less deep. However, since current waterways become very deep at river banks or lake sides due to bank protecting works, it is very difficult for the foregoing aquatic plants to grow naturally. In order to root the aquatic plants, foundation work has to be carried out on a relatively large scale, so that a foundation 81 is built using concrete, and a chamber 82 is provided on the foundation 81 as shown in FIG. 15. Then, coconut fiber 83 is filled in the chamber 82 so as to make a seed bed 80. In other words, the environment is improved for and enables growth of aquatic plants, which is effective in purifying the waterway. In this case, the foundation work is very expensive, and requires a lot of labor. Therefore, simple methods of promoting the natural purifying capabilities of the waterway have been studied recently.

Referring to FIG. 16, in one such method, a seed bed 80 is constituted by a mat 92 or the like, which is made of compressed and molded natural coconut shell, coconut chips, coconut carbon or the like. The mat 92 is covered by non-woven cloth or a net 91. Aquatic plants 70 are planted on the mat 92 as the seed bed, thereby forming a floating island. The floating island is placed in the waterway in order that the vegetation thereon promotes purification of the water. Referring to FIG. 17(B), an article comprises a string 96 as a core and loop yarns 97 wound around the string 96. A number of such articles are placed in the waterway so that microorganisms living in the water stick onto the loop yarns 97 and decompose organisms in the waterway, thereby purifying the waterway.

With the first mentioned method in which vegetation is raised on the seed bed 80 in order to purify the water, the mat 92 made of coconut fibers or made by processing coconut fibers used as the seed bed 80 is relatively expensive. Further, since each item of vegetation has very small purifying capabilities, a great number of mats 92 as the seed beds 80 should be provided in order to raise a great amount of vegetation and in order to purify the water to a certain degree. Therefore, this method is very expensive for performing water purification.

In order to demonstrate the water purification capabilities, the vegetation 70 should grow its roots 71 through which nutritious salt such as phosphorous, nitride and so on in the water are sucked. The voids of the seed bed 80 should be 80% or more in order to raise the roots 71 of the vegetation, and vegetation such as reeds and bulrush in particular. However, currently available seed beds 80 made of compressed coconut fibers or coconut shells usually have voids of 80% or less, and cannot sufficiently grow the roots 71 of the vegetation 70. On the other hand, the seed bed 80 made of coconut fibers or coconut shell and having voids of 80% or more cannot withstand weight of grown vegetation 70 such as reeds, and cannot effectively carry out its function.

For the foregoing reasons, the seed bed 80 with the vegetation growing thereon is used to improve the view at the waterside rather than to purify the water. The effect of water purification is only slightly accomplished as a side-effect.

As for the second mentioned method in which innumerable loop like cylindrical structures 95 are placed in the water, microorganisms living in the loop yarns 97 decompose organisms therein; which purifies the water. If such loop like cylindrical structures 95 are placed on a riverbed along the flow of the waterway as shown in FIG. 17(A), only the water flowing on the riverbed comes across them. Therefore, a very limited amount of water can come into contact with the loop like cylindrical structures 95, which means that sufficient water purification effects cannot be expected.

On the other hand, if each cylindrical structure 95 is placed in the waterway along the depth thereof, it should be connected to the riverbed and a float 98 at its opposite ends as shown in FIG. 17(B). However, innumerable man-made floats 98 on the surface of the waterway may adversely affect the scenery.

Still further, fibers serving as homes for microorganisms may be preferably natural fibers having uneven surfaces and being comfortable rather than synthetic resin fibers having smooth surfaces. However, natural fibers tend to decay when they are used in the water for a long period of time.

Therefore, the present invention has been contemplated in order to overcomes the foregoing problems of the related art. Particularly, the invention is aimed at providing a resin cultivating base which has voids appropriate for raising aquatic plants such as reeds and bulrush and is durable for a long period of time in water, which are contradictory each other. Further, the invention provides a water purifying device composed of the foregoing resin cultivating base, and a method of purifying water in order to improve the environment around the waterway and comfort people by promoting the natural purifying capabilities of the vegetation planted on the resin cultivating base.

SUMMARY OF THE INVENTION

According to the invention, the resin cultivating base 30 on which vegetation 70 is planted is partially immersed in the waterway and serves as a seed bed. The resin cultivating base 30 is a three-dimensional structure made of long and short thermoplastic resin filaments in the shape of a random loop or curl. The long and short thermoplastic resin filaments are contacted, entwined and gathered, and form a low density portion A which has many voids and has vegetation 70 planted thereon, and a high density portion B which has few voids. The low density portion A is 80% to 99% voids, and preferably 85% to 97%, or more preferably 90% to 95% voids.

Each resin cultivating base 30 has both low and high density portions in a unit base. The voids are derived using the following formula.

Voids (%)=(1-bulk density/specific gravity of resin)×100

The resin cultivating base 30 may be provided with recesses 32 on the upper surface thereof in order to plant vegetation 70. Further, it is possible to form hollow spaces 31 which open on an outer surface and are free from filaments. When the resin cultivating base 30 is placed in the waterway, fish or other vegetation lives the hollow spaces 31, or fish can pass through the hollow spaces 31.

When a number of the resin cultivating base 30 with vegetation 70 planted thereon are coupled and are placed in the waterway to be purified, they can serve as a water purifying device 50.

According to the invention, the water purifying method comprises the steps of: planting vegetation on the resin cultivating base 30; installing the resin cultivating base 30 in the waterway; and helping the vegetation to grow thereon; allowing the vegetation to suck via its roots nutritious salt such as phosphorous, nitride and other water pollutants from the water for the purpose of purifying the waterway. Further, this method features that when the vegetation 70 have its roots 71 entwined with the filaments of the resin cultivating base 30, the resin cultivating base 30 serve as ideal homes for microorganisms which can effectively decompose water pollutants such as organisms.

The resin cultivating base 30 may have a multi-tier structure in which a resin cultivating base 30A having the low density portion A and a resin cultivating base 30B having the high density portion B are provided, i.e. a two-tier structure. The resin cultivating base 30A and 30B are independent from each other, and the resin cultivating base 30B is provided under the resin cultivating base 30A. A water flow space H can be formed between the high density portion B and the bottom of the waterway as shown in FIG. 11.

Further, the multi-tier structure is obtained by providing a resin cultivating base 30 having both the high low and high density portions in a unit base under the resin cultivating base 30A with the low density portion A. Still further, the resin cultivating base 30B having the high density portion B may be positioned under the resin cultivating base 30 having the low and high density portions in a unit base.

Preferably, pipes are provided in the water flow space H in order to generate bubbles therein and ventilate the water flow space H (see FIG. 11).

The multi-tier structure is used mainly in order to maintain the rigidity of the water purifying device and the following purpose. Specifically, when land vegetation is planted on the resin cultivating base, their stems approximately 10 cm from their roots are held on the water surface in order to protect them against spoiling. The multi-tier structure is effective in circulating fresh air throughout the resin cultivating base and supplying air to the roots of the vegetation.

A plurality of waterways W communicating with the reservoir may be provided side by side, so that the water passing through the water purifying device may be returned to the river including the waterways W. Further, the water purifying device constituted by a plurality of resin cultivating base and provided for a single or a plurality of waterways may be covered by a vinyl house, and placed in a green house in order to promote growth of vegetation in winter (not shown).

Further, the multi-tier structure may be a three-tier structure. With the three-tier structure (also with the two-tier structure), four corners of a resin cultivating base which is positioned near a border between upper and lower resin cultivating base or which is present near the surface of the water are fixedly attached to a frame F, thereby securing the buoyancy of the resin cultivating base (see FIG. 12). The frame F is made of hollow synthetic resin woods, has its open ends closed by caps, and is preferably filled with a material with high buoyancy such as foamed styrene.

When the multi-tier structure is employed, the resin cultivating base are mutually coupled via holes in high density portions at the corners thereof using fixtures such as bolts and nuts. Further, it is preferable that the fixtures may be fixedly attached via stays to the frame made of the hollow synthetic resin woods (not shown).

Still further, the synthetic resin woods may be assembled in the shape of a square frame on the river bed, so that resin cultivating base having the multi-tier structure are fitted in a frame Y (see FIG. 13).

The hollow spaces 31 free from the filaments may be used to enable posts S to pass through in order that the resin cultivating base may be fixedly positioned in the waterway W (as shown in FIG. 14). The posts S are installed in the waterway.

In addition, each resin cultivating base includes low and high density portions which are oriented in the same direction in a unit base, so that a plurality of resin cultivating base may be laid over one after another with their directions of the high and low density portions alternately crossed (not shown).

BRIEF DESCRIPTION OF THE DRAWINGS

The objects and advantages of the invention will become understood from the following detailed description of preferred embodiments thereof in connection with the accompanying drawings in which like numerals designate like elements, and in which.

DETAILED DESCRIPTION OF THE PREFERRED EMBODIMENT

Figure 1:
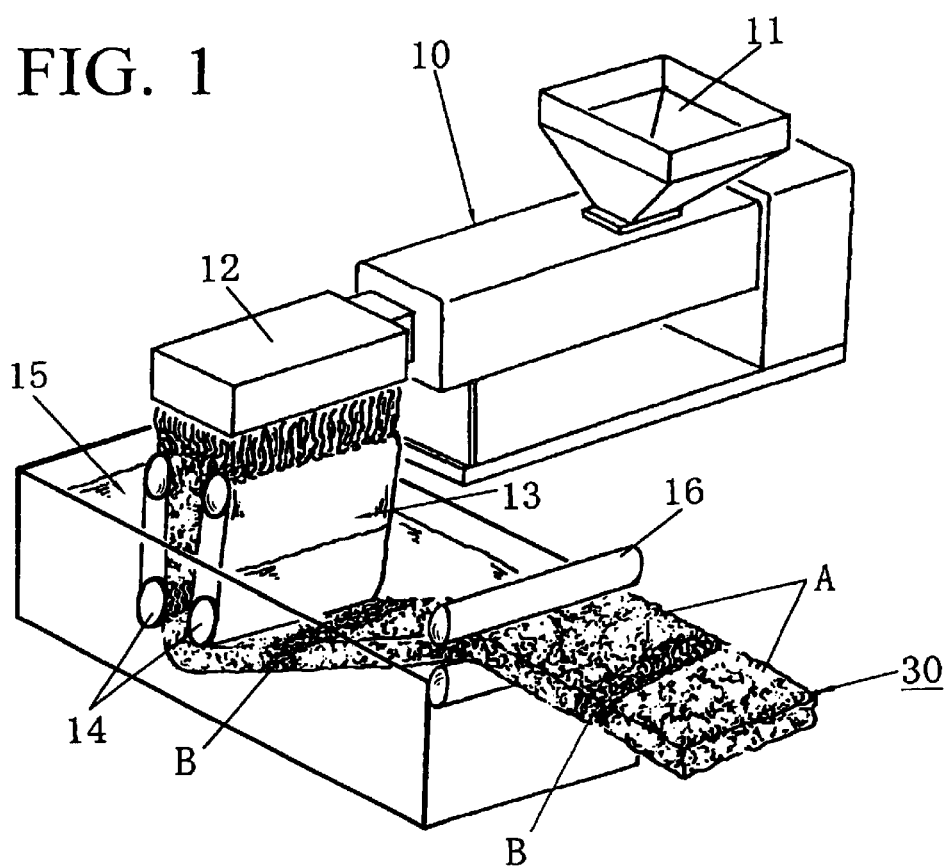
FIG. 1 shows a device for manufacturing a resin cultivating base.

The invention will be described with reference to the preferred embodiment shown in the drawings.

The invention relates to a resin cultivating base which is suitable for planting and raising aquatic plants such as reed and bulrush in the waterway. The resin cultivating base with the foregoing vegetation planted thereon is placed in the waterway in order that the vegetation sucks nutritious salt such as nitride and phosphorus in the water. Further, microorganisms may live in the resin cultivating base where the vegetation has its roots entwined and decompose organisms in the water, thereby purifying the water. The resin cultivating base of the invention serves as a seed bed for the vegetation, provides homes for microorganisms together with roots of the vegetation planted thereon, and is placed in the waterway in order to purify it.

Resin Cultivating Base

The resin cultivating base of the invention has voids which do not adversely affect the growth of vegetation, especially aquatic plants, remains very durable for a long period of time, and is strong enough to withstand the weight of grown vegetation. The resin cultivating base comprises random long and/or short thermoplastic resin filaments in the shape of a random loop or curl yarn which are contacted, entwined and gathered, and is a springy three-dimensional structure having predetermined voids and made of molded resin.

The resin cultivating base is manufactured as follows. For example, fused thermoplastic elastomer is extruded at a predetermined speed via a plurality of nozzles of an extruder, is fed by a pair of winders (to be described later) and is formed into solid or hollow filaments of 600 deniers to 90,000 deniers, preferably 3,000 deniers to 30,000 deniers, more preferably 6,000 deniers to 10,000 deniers. The filaments in a fused state are formed with curls of 1 mm to 10 mm in diameter, preferably with curls of 1 mm to 5 mm in diameter, are contacted and entwined in the water, are fed to a length of 25 cm to 30 cm at a regular speed, and fed to a length of 5 cm to 10 cm at a low speed. In other words, the resin cultivating base is the three-dimensional structure having a high density portion B of 5 cm to 10 cm long, a low density portion A being 20 cm to 30 cm thick, and 1000 mm wide (refer to FIG. 1 and FIG. 7). The contacted, entwined and gathered parts of the filament are partially fused and stuck to one another.

The long and/or short filaments have a diameter of 0.2 mm to 5.0 mm, preferably a diameter of 0.3 mm to 0.7 mm.

The long and short filaments are preferably made of thermoplastic elastomer, e.g. polypropylene, polyester, nylon or PVC elastomer.

The bulk density of the resin cultivating base at the low density portion is 0.009 $g/cm^3$ to 0.280 $g/cm^3$, preferably 0.027 $g/cm^3$ to 0.210 $g/cm^3$, and most preferably 0.045 $g/cm^3$ to 0.09 $g/cm^3$, while the bulk density at the high density portion is 0.45 $g/cm^3$ to 1.25 $g/cm^3$, preferably 0.54 $g/cm^3$ to 1.17 $g/cm^3$, and most preferably 0.63 $g/cm^3$ to 1.10 $g/cm^3$.

The voids of the resin cultivating base at the low density portion are 80% to 99%, preferably 85% to 97%, and most preferably 90% to 95% while the voids at the high density portion are 40% to 90%, preferably 70% to 90%, and most preferably 75% to 85%.

Method of Manufacturing Resin Cultivating Base

Referring to FIG. 1, the resin cultivating base is manufactured using an extruder 10. Polypropylene elastomer is put into the extruder 10 via a hopper 11, is melted and kneaded therein, is forcibly injected through a number of holes formed on a molding die 12 and having a predetermined diameter, is fed by feed rollers 14 of a winder 13 in a bath 15, is randomly curled or looped, is hardened in the water, and is taken up via taken-up rollers 16 as a molded springy resin product, i.e. the resin cultivating base 30. The thickness and bulk density of the resin cultivating base 30 are determined by the feed rollers 14. An example of the molding die 12 for injecting filaments constituting the resin cultivating base 30 is shown in FIG. 2 to FIG. 5.

Figure 2:
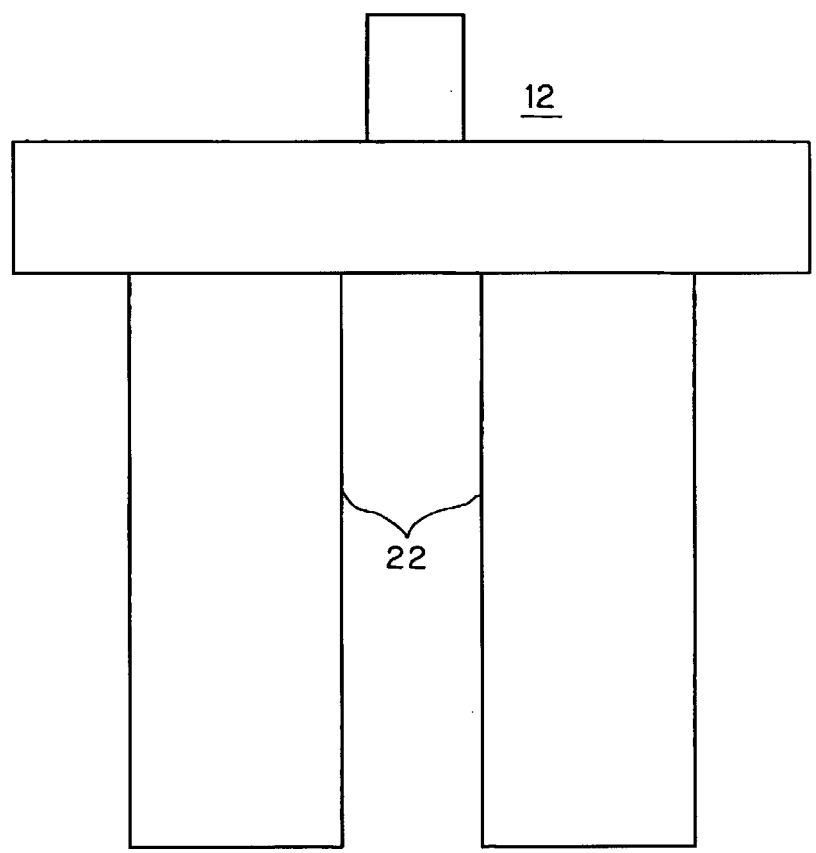
FIG. 2 is a front elevation of a molding die.

Referring to FIG. 2, the molding die 12 is provided with a number of nozzles 21 via which synthetic resin filaments are injected. The filaments are then hardened.

In this embodiment, cores 22 project in the injecting direction of the molding die 12, and have a rectangular cross section. The cores 22 are used to form spaces 31 where no filaments are present in the resin cultivating base 30.

The spaces 31 will be used as homes for fish, shrimps, crabs, water insects and organisms in the water, or used as paths through which fish pass.

Figure 3:
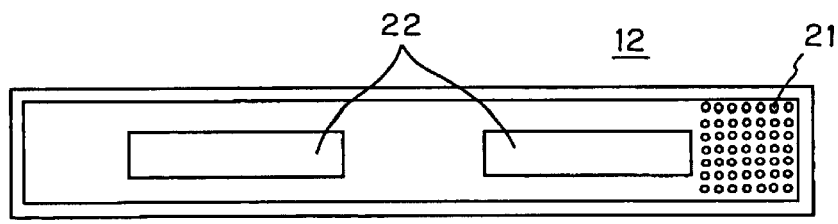
FIG. 3 is a bottom elevation of the molding die.
Figure 4:
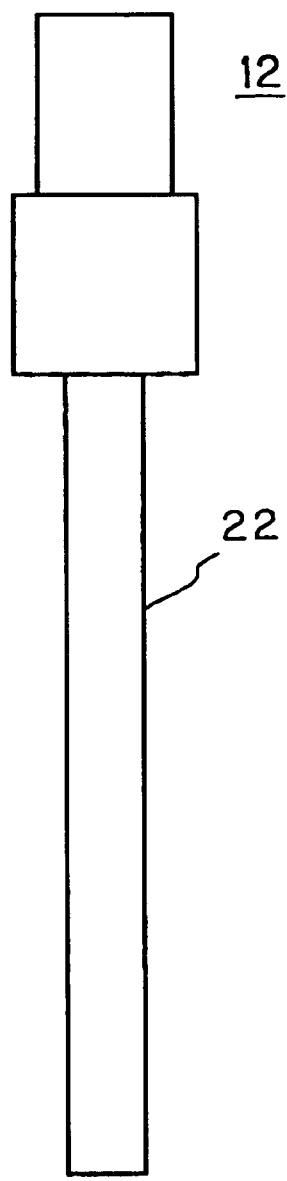
FIG. 4 is a left side elevation of the molding die.

The spaces 31 have a rectangular cross section as shown in FIGS. 2 and 3. Alternatively, they may have a circular cross section or any other shape so long as they can serve as hoses for aquatic organisms or paths through which fish pass. Further, if no spaces 31 are required, no cores 22 will be provided in the molding die 12.

Figure 5:
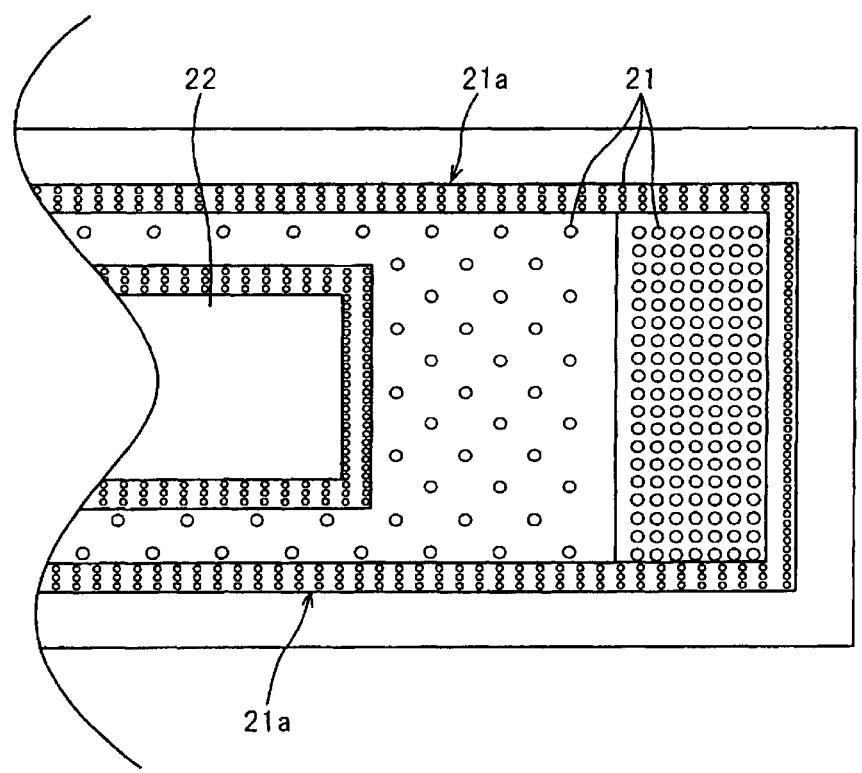
FIG. 5 is an enlarged view of the essential parts of nozzles, showing a modified example of the molding die.

FIG. 5 shows a modified example of the nozzles 21 of the molding die 12 of FIG. 3. In this case, nozzles 21a are very crowded at the peripheral area of the molding die 12 and around the cores 22 defining the spaces 31. Therefore, the resin cultivating base 30 is the springy structure having filaments densely entwined at its peripheral edge and around the spaces 31. This structure is effective in making the resin cultivating base 30 more durable, and protecting it against deformation and breakdown.

The filaments injected from the molding die 12 are preferably fed by a pair of winders 13, each of which comprises the feed roller 14, driven rollers 17 and an endless belt 18 extending around the rollers 14 and 17. The feed rollers 14 rotate in opposite directions. Specifically, the filaments injected from the molding die 12 are drawn and sandwiched between the endless belts 18. In this embodiment, the endless belts 18 of the winder 13 have uniformly spaced projections 19.

The projections 19 are in the shape of a cylinder or a truncated cone, and have a diameter of 50 mm to 60 mm and a height of 70 mm to 100 mm.

In this embodiment, the hot and soft filaments are brought into contact with and deformed by the projections 19 on the surface of the endless belts 18 of the winder 13. Therefore, the resin cultivating base 30 is formed with recesses 32 on its surfaces in accordance with the shape of the projections 19. The recesses 32 are controlled to be formed on the low density portion A of the resin cultivating base 30.

Figure 6:
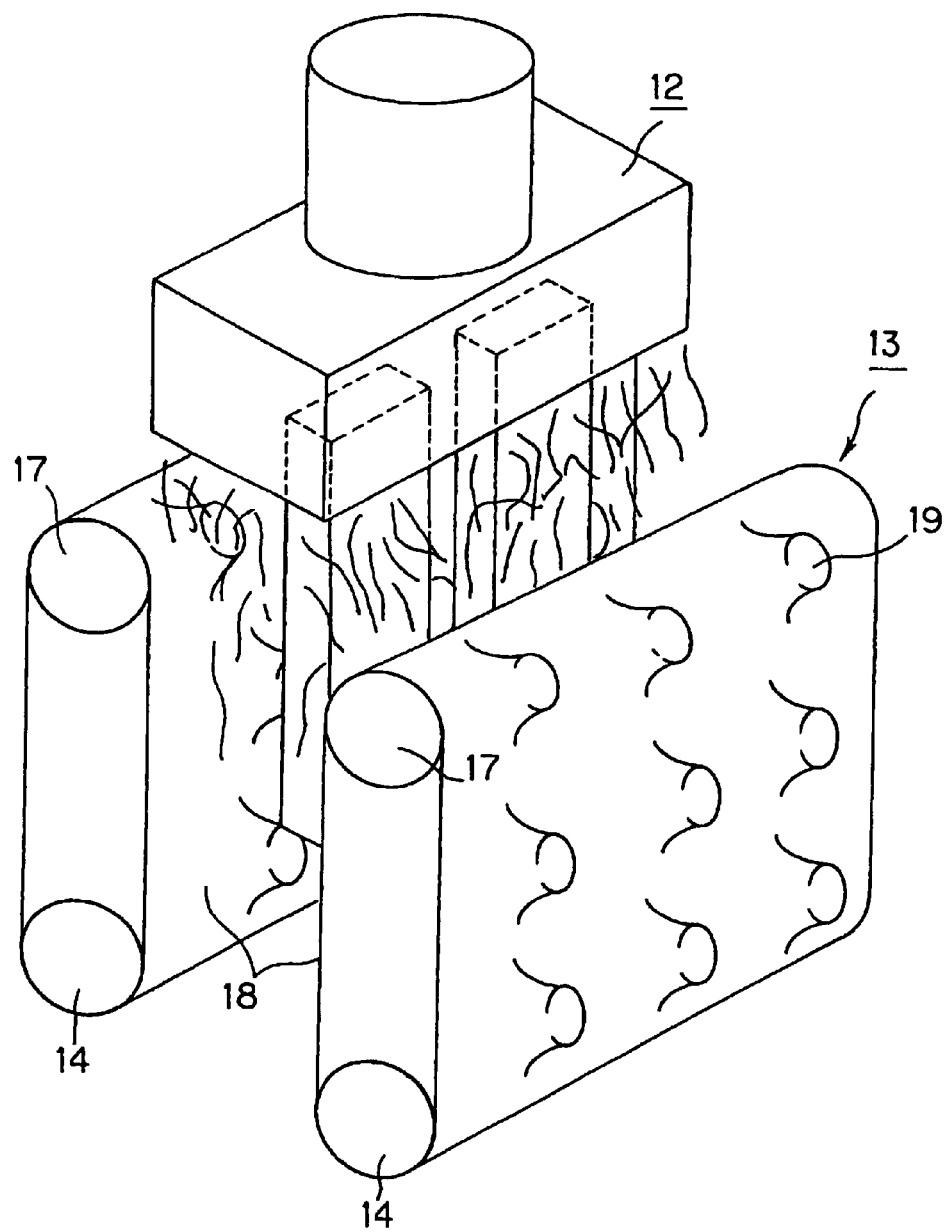
FIG. 6 schematically shows a winder.

Aquatic plants such as reed and bulrush and other vegetation are planted in the recesses 32. The size of the recesses 32 may be determined as desired in accordance with kinds of vegetation 70 to be planted, the size of seedlings, and so on. In the example shown in FIG. 6, the recesses 32 are on opposite surfaces of the resin cultivating base 30. Alternatively, the recesses 32 may be made on one surface of the resin cultivating base 30.

If the feed rollers 14 are periodically rotated at a low speed for a predetermined period, the resin cultivating base 30 has high density portions B which are regularly spaced, and has a predetermined length and bulk density.

Figure 7:
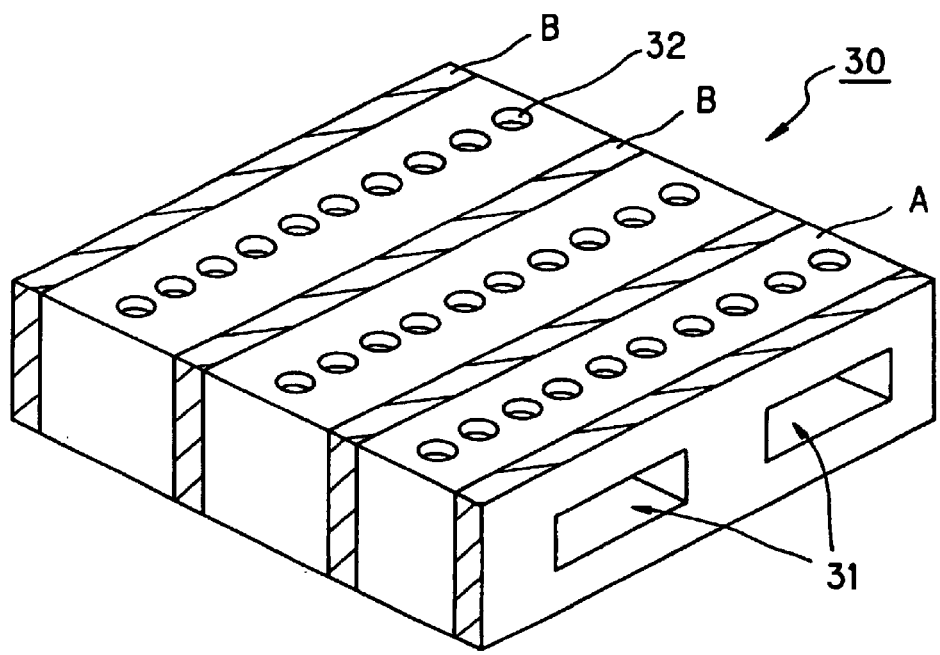
FIG. 7 is a perspective view of a resin cultivating base according to one embodiment of the invention.

FIG. 7 shows one example of the resin cultivating base 30 prepared by the foregoing method. The resin cultivating base 30 is 1000 mm long, 1000 mm wide and 200 mm thick, and is provided with 30 recesses 32 thereon, for example.

The resin cultivating base 30 includes four equally spaced high density portions B with the voids of 75% to 85%, and low density portions A with the voids of 90% to 95% which are sandwiched between the high density portions B.

With the resin cultivating base 30, the low density portions A have the voids which are suitable to plant and raise vegetation 70. On the other hand, the high density portions B not only totally reinforce the resin cultivating base 30 in order to protect it against deformation and damage caused by the weight of grown vegetation but also make the resin cultivating base 30 strong enough to support people who climb thereon in order to plant vegetation or do other works when it is on the ground.

The low and high density portions may be cut at to a desired length and used separately if necessary. Alternatively, the low and high density portions may be manufactured independently.

Water Purifying Device

A water purifying device 50 is constituted by a single resin cultivating base 30 or a plurality of resin cultivating base 30 which are piled or linked to a predetermined size. Aquatic plants such as reed and bulrush or other vegetation is planted in the recesses 32 of the resin cultivating base 30, which are placed in the waterway. The water purifying device 50 purifies the waterway.

The water purifying device 50 can have a desired size simply by piling or linking the resin cultivating base 30 without any particular measures.

When the resin cultivating base 30 are laid over one after another, the resin cultivating base 30 except for that at the uppermost level may be free from the recesses 32.

The water purifying device 50 with the vegetation 70 such as reed and bulrush being present in the recesses 32 on the uppermost resin cultivating base 30 is installed in the river, lake or marsh to be purified. If necessary, the resin cultivating base 30 where microorganisms for decomposing organisms are present may be installed in the waterway.

When the water purifying device 50 is installed in the waterway, the vegetation sucks nutrients present in the water, makes roots and grows in the resin cultivating base 30. Especially, since the resin cultivating base 30 have voids of 80% or more, i.e. 90% to 95% in this embodiment, vegetation 70 can grow without any problem. On the other hand, the high density portions B provided at regular intervals can protect the resin cultivating base 30 against deformation and enable the resin cultivating base 30 to withstand the weight of grown up vegetation 70.

The vegetation 70 sucks nutritious salt such as nitride and phosphor via its roots 71 and grows sufficiently, thereby effectively purifying the water.

The resin cultivating base 30 where the vegetation roots extensively can provide the environment suitable for breeding microorganisms which decompose organisms in the water. The resin cultivating base 30 itself includes filaments which are made of thermoplastic resin and have smooth surfaces. However, roots of the vegetation growing in the resin cultivating base 30 are natural fibers having uneven surfaces, which provide the environment where microorganisms easily stick and grow. Further, the roots of living vegetation do not decay even if they are in the water for a long period of time, so that the resin cultivating base 30 made of resin and the roots of vegetation forms an ideal breeding bed for microorganisms.

When the water passes through the resin cultivating base 30 constituting the water purifying device 50, organisms in the water stick to roots 71 of the vegetation 70 and filaments or decomposed by microorganisms living among the vegetation roots 71 and filaments, so that the water is effectively purified.

This water purifying device 50 also functions as egg laying areas, breeding areas or homes for fish, shrimps, crabs, aquatic insects and other living things in the water. Therefore, food refuse discharged into the waterway together with household sewage are caught by the resin cultivating base 30 and vegetation roots 71 which function as filters. Larger objects are eaten by living things in the water purifying device 50 while smaller objects such as dung of aquatic living things or food refuse not consumed as bait are decomposed by microorganisms in the water. In other words, the water purifying device 50 produces a preferable food chain or an ecological system which promotes natural purifying capabilities of the waterway, thereby effectively purifying the water.

Installation Examples

The water purifying device 50 is installed as follows. It is assumed here that a waterway is approximately 1.5 m wide, approximately 1 m deep, and 18 m long. The water purifying device 50 comprises a plurality of resin cultivating base 30, and is 1000 mm long, 1000 mm wide and 200 mm thick as shown in FIG. 7. The number of resin cultivating base 30 to be piled is determined in accordance with the depth of the waterway, or preferably such that vegetation is not buried under the water or its roots are not exposed from the surface of the water. In this example, three resin cultivating base 30 are piled in order to form a block 600 mm thick, and 18 blocks are coupled in series to form the 18 m long water purifying device 50 (refer to FIG. 8).

The high density portions B of respective resin cultivating base 30 or blocks of the resin cultivating base 30 are coupled using string, rope, wire or other coupling members in order that the resin cultivating base 30 are protected against breakdown at the coupled or linked areas due to resistance of the water or an increase in the weight of grown vegetation 70.

Each top resin cultivating base 30 of the block is provided with 30 recesses 32, where 15 to 30 seedlings of aquatic plants such as reeds are planted.

The water purifying device 50 with the reeds planted thereon is installed in the waterway with left and right equal margins of 250 mm long maintained from banks. The resin cultivating base 30 are arranged in the waterway such that the spaces 31 in which living things in the water live or through which fish passes extend across the waterway.

Figure 9:
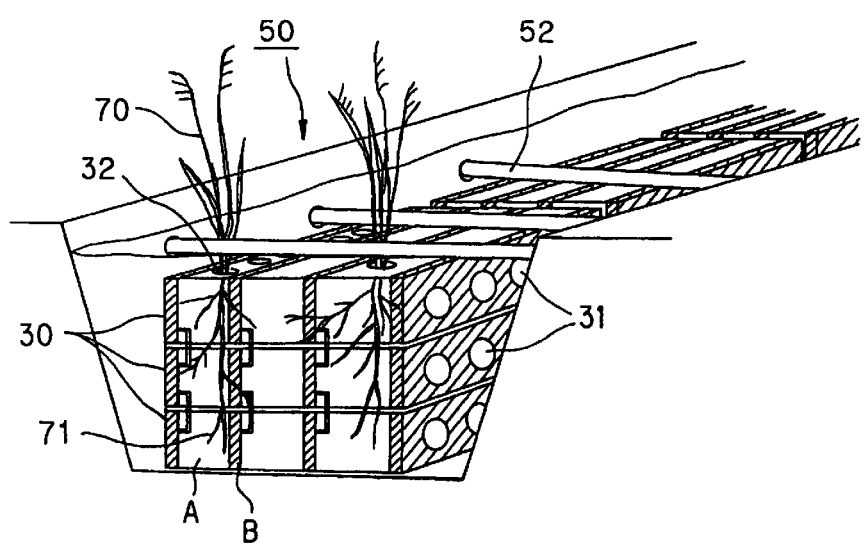
FIG. 9 is a perspective view schematically showing a method of installing the water purifying device.

The water purifying device 50 may be fixed using rods 52 bridging across the waterway so that it neither rises to the surface nor flows as for example shown in FIG. 9. Alternatively, the resin cultivating base 30 may be provided with weights.

Figure 10:
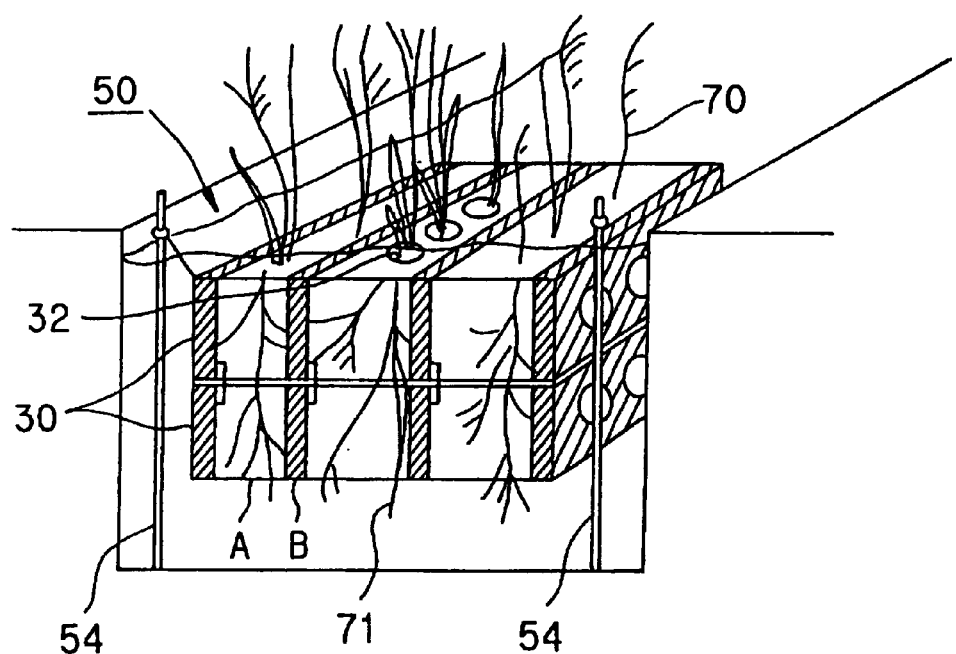
FIG. 10 is a perspective view schematically showing another method of installing the water purifying device.

In order to purify a relatively wide open water system such as a river lake or marsh, the water purifying device 50 may be tied to posts 54 driven into a bed of the river, lake or marsh. In this case, there may be some spaces around the water purifying device 50 so that it can remain afloat depending upon varying depth of water, as shown in FIG. 10. Further, it is possible to control the height of the water purifying device 50, e.g. by reducing the number of resin cultivating base 30 to be piled so that it does not come into contact with the bed of the waterway, lake or marsh.

The water purifying device 50 tied to posts with tolerances maintained around itself remains afloat in accordance with the increase or decrease of the volume of water, so that it is possible to prevent vegetation from being buried in the water or its roots 71 from being exposed on the water surface, which protects the vegetation against problems such as withering.

Figure 8:
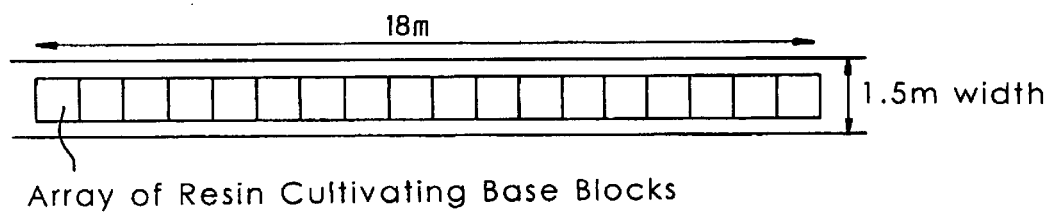
FIG. 8 shows an installation example of a water purifying device.

In the example of FIG. 8, a water purifying device 50 comprises blocks coupled to a length of 18 m, each of which includes three piled resin cultivating base 30. A moving speed of the water was 3.6 mm/sec to 18 mm/sec. After installing the water purifying device 50, the moving speed of the water was reduced to 1 mm/sec to 5 mm/sec.

This reduction of the moving speed means that the water to be purified remains in the water purifying device 50 approximately one hour or longer, and nutritious salt such as phosphor and nitride in the water is sucked by roots 71 of reeds grown in the resin cultivating base 30. As a result, the water is purified.

The vegetation roots 71 extending in the resin cultivating base 30 are living natural fibers which do not decay, have an affinity with microorganisms, and efficiently catch the microorganisms. Further, the moving speed of 1 mm/sec to 5 mm/sec is preferable to keep microorganisms stuck in the resin cultivating base 30, which promotes breeding of many microorganisms necessary for the water purification together with meshes of the resin cultivating base 30. Therefore, water pollutants such as organisms contained in the water flow at the foregoing slow speed are decomposed by microorganisms breeding in the resin cultivating base 30, so that the waterway is purified.

The water purifying device 50 installed in the waterway can efficiently reduce or eliminate BOD or COD therein by a variety of microorganisms.

Figure 11:
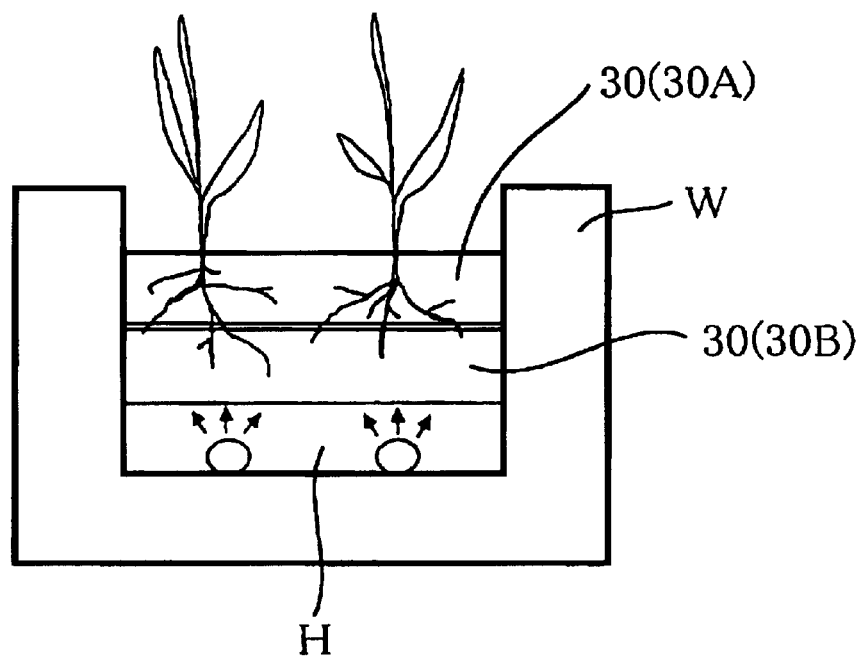
FIG. 11 is a sectional view schematically showing how resin cultivating base are installed in another example.

The low and high density portions A and B of the resin cultivating base 30 can be separately produced, or they are cut to appropriate lengths respectively. For example, referring to FIG. 11, a-water purifying device 50 may have a two-tier structure, in which a resin cultivating base 30B made of the high density portion B is positioned under a resin cultivating base 30A made of low density portion A. In this case, upper parts of vegetation roots are supported in the resin cultivating base 30A while lower parts thereof are supported in the resin cultivating base 30B. A water flow space H is formed between the high density portion B and the bed of the waterway W.

Although not shown, a plurality of the resin cultivating base 30 having both the low and high density portions in a unit base may be stacked up. Alternatively, the resin cultivating base 30A having the low density portion A is placed at an upper position, and the resin cultivating base 30 having both the low and high density portions A and B in a unit base may be placed under the resin cultivating base 30A. Further, the resin cultivating base 30 having both the low and high density portions A and B in a unit base is placed at an upper position, and the resin cultivating base 30B with the high density portion B is placed, under the resin cultivating base 30.

Pipes P for generating bubbles are provided in the water flow space H in order to ventilate the river, lake, marsh, or waterway W communicating with reservoirs such as purifying tanks of a sewage processing plant.

The foregoing multi-tier structure is effective in maintaining the rigidity, improving the buoyancy, promoting uniform dispersion of the air throughout the resin cultivating base, supplying a sufficient amount of the air to vegetation roots, keeping upper parts of vegetation roots approximately 10 cm above the water surface, and protecting vegetation roots against decaying. These features are particularly advantageous for growing land plants such as kenaf using the resin cultivating base.

Further, it is possible to juxtapose a plurality of waterways W communicating with a reservoir, and to return the water purified by the water purifying device to a river including the waterway W. Although not shown, a water purifying device comprising resin cultivating base may be installed in a single waterway or a plurality of waterways. Such a water purifying device may be covered by a vinyl house and then accommodated in a green house in order to promote growth of vegetation in winter.

Figure 12:
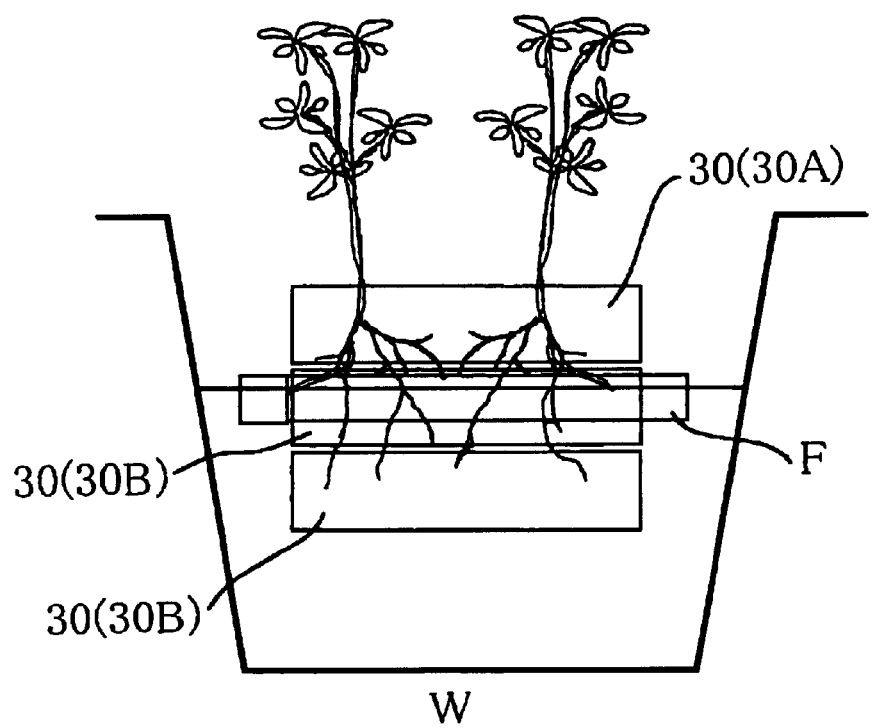
FIG. 12 is a sectional view schematically showing how resin cultivating base are installed in a further example.

Still further, as shown in FIG. 12, when the three-tier structure is employed, the second resin cultivating base, the resin cultivating base near the border of the upper and lower resin cultivating base or the resin cultivating base near the surface of the water may have four corners thereof fixedly supported by a frame made of hollow and light synthetic resin woods disclosed in Japanese Patent No. 2872590, so that the water purifying device remains afloat as planted vegetation grows thereon.

The open ends of the hollow space of synthetic resin woods may be closed by caps, or the hollow space may be preferably filled with buoyant foamed stylol and are closed at the open ends. This is effective in keeping the water purifying device afloat.

When a plurality of resin cultivating base are stacked up, they are preferably coupled via the high density portions at four corners thereof using fixtures such as bolts and nuts and holes at the four corners. More preferably, the fixtures may be fixedly attached via stays to a frame constituted by the synthetic resin woods.

The buoyancy of the synthetic resin woods with the voids of 70%, length of 1000 mm, width of 200 mm and height of 100 mm is approximately 13.5 kg.

Figure 13:
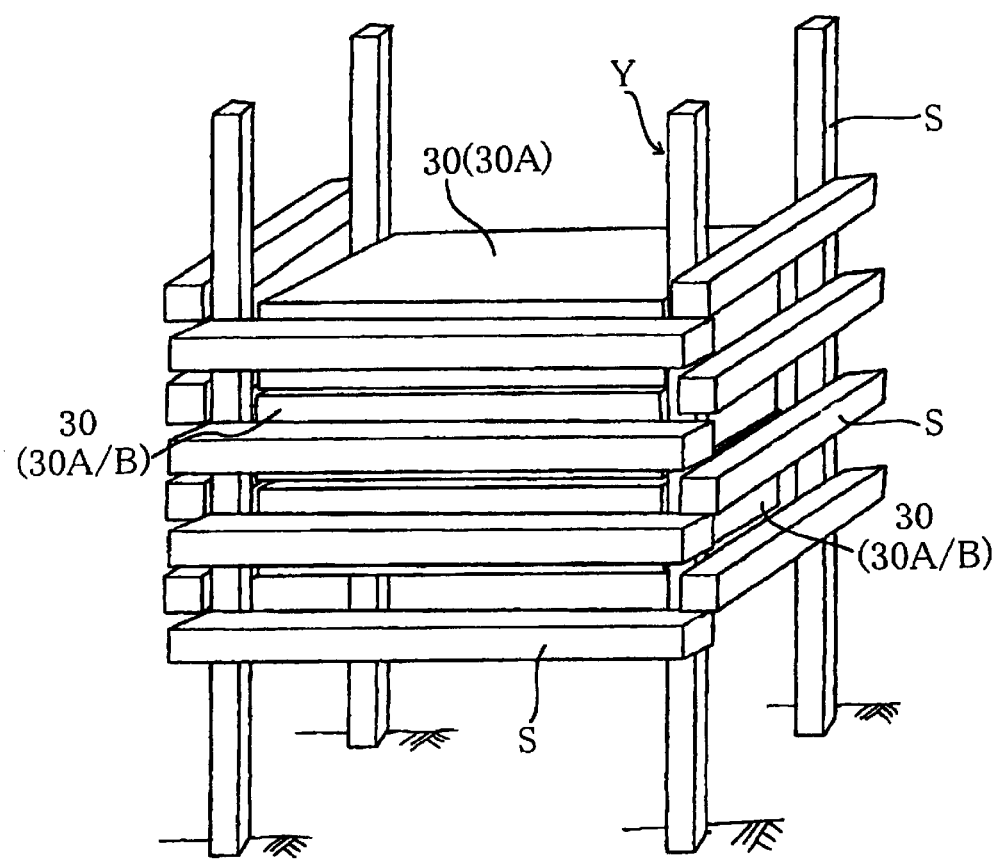
FIG. 13 is a sectional view schematically showing how resin cultivating base are installed in a still further example.

Referring to FIG. 13, the water purifying device including resin cultivating base in the multi-tier structure is fitted in a square frame assembled using the hollow synthetic resin woods and placed on the bed of the waterway.

Figure 14:
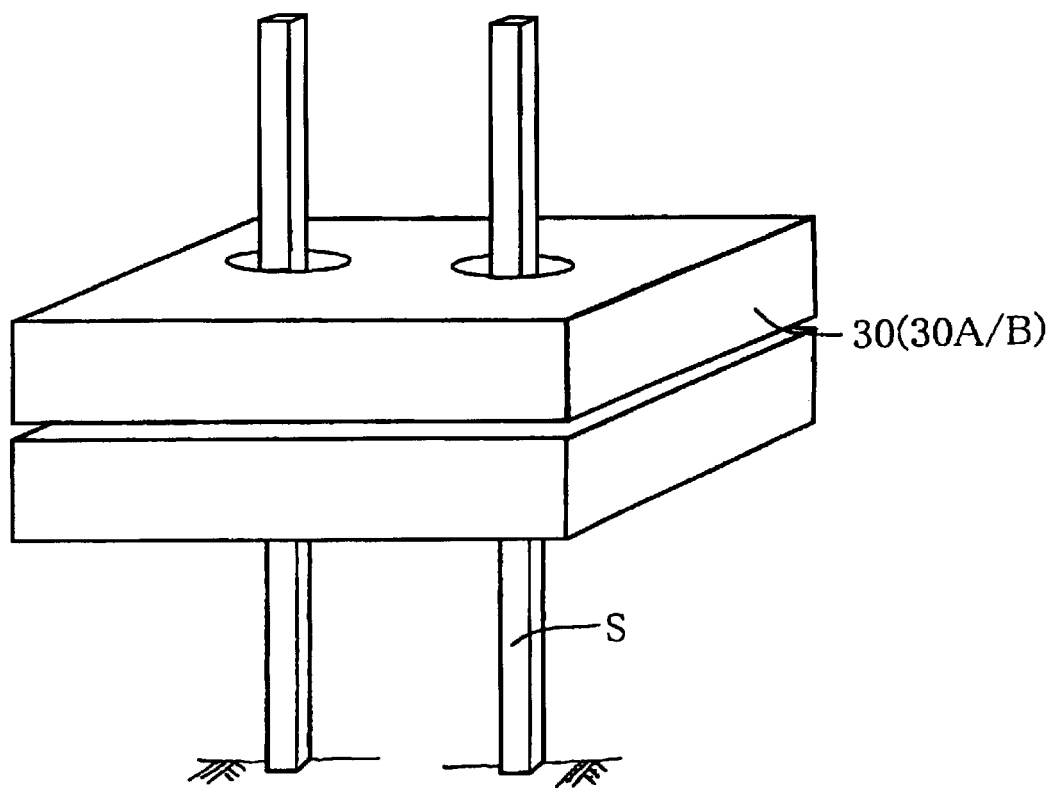
FIG. 14 is a sectional view schematically showing how resin cultivating base are installed in a still further example.
Figure 15:
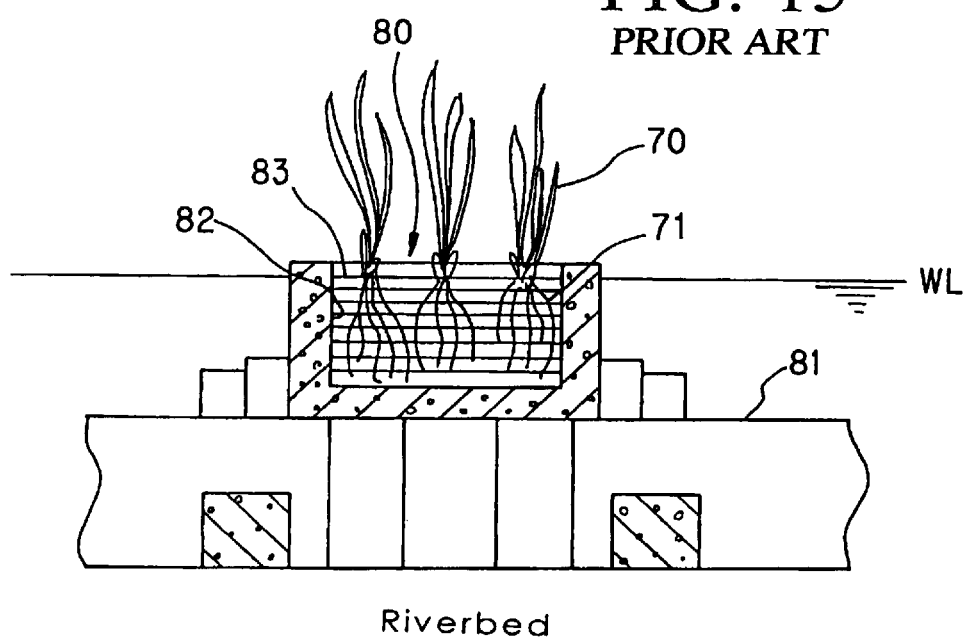
FIG. 15 is a perspective view of an example of resin cultivating base of the related art.
Figure 16:
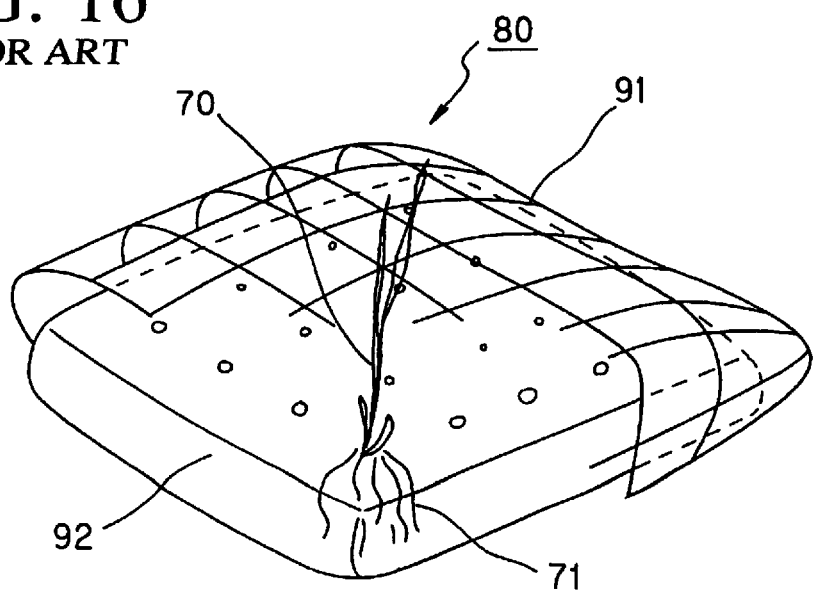
FIG. 16 is a sectional and perspective view showing another example of a resin cultivating base of the related art.
Figure 17:
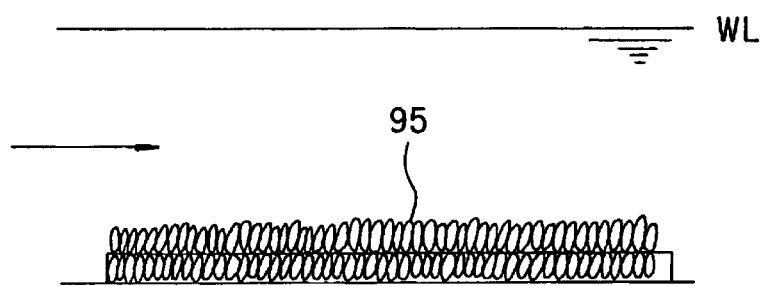
FIG. 17(A) shows another resin cultivating base of the related art installed in the waterway in the flowing direction thereof.
FIG. 17(B) shows the resin cultivating base of FIG. 17(A) installed in the waterway along the depth thereof.
Figure 17:
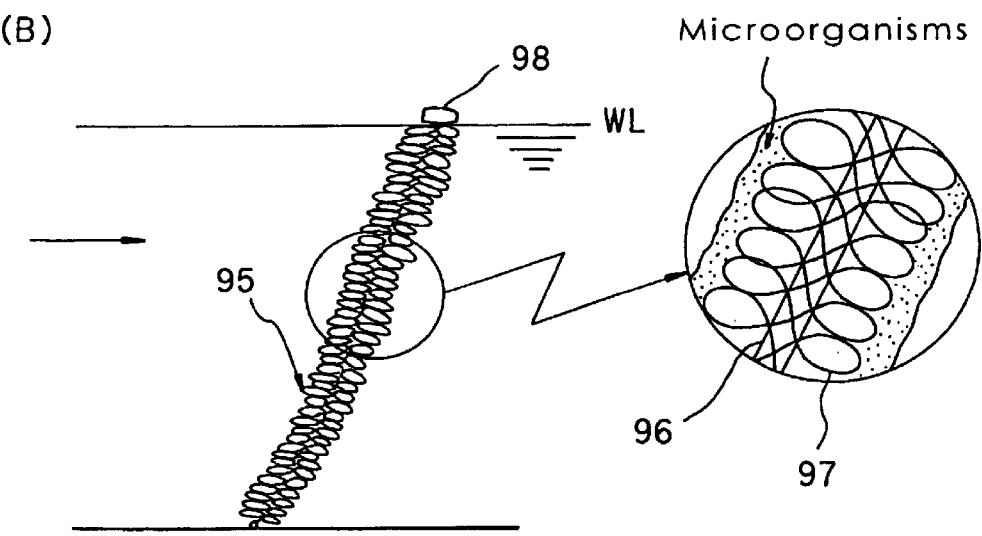

As shown in FIG. 14, support poles S made of the synthetic resin woods and standing on the bed of the waterway W may pass through spaces 31 of the resin cultivating base which are free from filaments, thereby fixedly supporting the resin cultivating base.

Although not shown, the resin cultivating base in which each low portion and each high density portion are oriented in one direction in a unit base may be piled such that the directions of the low and high density portions alternately cross.

The resin cultivating base has the voids of 90% to 95% at its low density portions where vegetation is planted, has a springy structure in which the low density portion is reinforced by the high density portions provided at regular intervals. The resin cultivating base is suitable for growing aquatic vegetation such as reeds and bulrush. When the water purifying device comprising the foregoing resin cultivating base is simply installed in the waterway to be purified, vegetation planted on the resin cultivating base grow and have their roots extending in the resin cultivating base. Then, microorganisms breed in spaces in the resin cultivating base where vegetation roots extend, and decompose organisms in the water, thereby purifying the water.

Especially, the resin cultivating base made of resin which does not corrode after immersion in the water for a long period of time, but can provide homes for microorganisms together with vegetation roots extending therein, i.e. the resin cultivating base can meet contradictory requirements. This effect has been impossible up to now. The water purifying device constituted by such resin cultivating base can contribute to purification of the waterway.

With the water purifying device and the water purifying method of the invention, vegetation planted on the resin cultivating base can beautify river banks which have become desolate due to bank protection works or the like, i.e. contribute to restoration of beautiful scenery inherent to the waterway.

The resin cultivating base is made of thermoplastic resin, which can be recycled after use.

Thus the broadest claims that follow are not directed to a machine that is configure in a specific way. Instead, said broadest claims are intended to protect the heart or essence of this breakthrough invention. This invention is clearly new and useful. Moreover, it was not obvious to those of ordinary skill in the art at the time it was made, in view of the prior art when considered as a whole.

Moreover, in view of the revolutionary nature of this invention, it is clearly a pioneering invention. As such, the claims that follow are entitled to very broad interpretation so as to protect the heart of this invention, as a matter of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustration and not in a limiting sense. It is also to be understood that the following claims are intended to cover all of the generic and specific features of the invention herein described, and all statements of the scope of the invention which, as a matter of language, might be said to fall therebetween.

Now that the invention has been described:

What is claimed is:

1. A resin cultivating base serving as seedling beds for vegetation and partially immersed in a river, lake, marsh, ponds, or waterway drawing water from them, wherein the resin cultivating base is a three-dimensional structure constituted by long and/or short filaments of thermoplastic resin;

adjacent long and short filaments are curled or looped at random, and contacted, entwined and gathered, thereby forming a low density portion and a high density portion;

the low density portion has 80% to 99% voids which is a higher void rate than the void rate of the high density portion;

and vegetation is planted on the low density portion.

2. The resin cultivating base of claim 1, wherein the resin cultivating base is provided with recesses thereon for planting vegetation.

3. The resin cultivating base of claim 1, including spaces free from filaments, the spaces opening on a peripheral area thereof.

4. A water purifying device comprising a resin cultivating base of any of claim 1, wherein the resin cultivating base planted with aquatic vegetation and land vegetation thereon is installed in the waterway to be purified.

5. The water purifying device of claim 4, comprising a plurality of resin cultivating base coupled with one another.

6. A water purifying method comprising the steps of;

planting vegetation on the resin cultivating base of any one of claim 1; installing the resin cultivating base in a waterway to be purified; growing the vegetation and allowing the vegetation to suck water pollutants; forming seedling beds for microorganisms using filaments of the resin cultivating base and roots of vegetation growing therein; and allowing microorganisms to decompose water pollutants in the water.

7. The resin cultivating base of any one of claim 1, including the low density portion and the high density portion in a unit base.

8. The resin cultivating base of any one of claim 1, wherein the low density portion and the high density portion are separately manufactured; the low density portion is positioned on the high density portion for the purpose of making a multi-tier structure; and the multi-tier structure is placed in the waterway with a water flow space maintained between the high density portion and a bed of the waterway.

9. The method of claim 6, wherein a plurality of waterways are juxtaposed, and the purified water is returned to the waterways.

10. The resin cultivating base of any one of claim 1, wherein a frame made of hollow synthetic resin woods is fixedly connected to four corners of the high density portion near a border between the low density portion and the high density portion, or to four corners of the high density portion near the surface of the water.

11. The resin cultivating base of any one of claim 1, wherein the synthetic resin woods are assembled in the shape of a square frame on a bed of the waterway, and the resin cultivating base including the low and high density portions is fitted into the frame.

12. The resin cultivating base of claim 3, wherein the spaces free from the filaments are used for enabling posts, which are made of synthetic resin woods and stand upright on the bed of the waterway, to pass through, for the purpose of fixing the resin cultivating base.

13. The resin cultivating base of any one of claim 1, wherein a plurality of resin cultivating base including the low and high density portions in a unit base are stacked up to form a multi-tier structure.

14. The resin cultivating base of any one of claim 1, wherein a resin cultivating base including both the low and high density portions in a unit base is positioned on a resin cultivating base including the high density portion.

15. The resin cultivating base of any one of claim 1, wherein the resin cultivating base on the waterway is covered by a vinyl house.

16. The resin cultivating base of any one of claim 10, wherein open ends of the hollow space formed in hollow synthetic resin woods are closed by caps, or preferably the hollow space are filled with foamed styrene having a high buoyancy.

17. The resin cultivating base of any one of claim 10, wherein holes are made at four corners of each high density portion and a plurality of resin cultivating base are coupled using fixtures such as bolts and nuts fitted in the holes and the fixtures are fixedly connected to the frame.

18. The resin cultivating base of any one of claim 1, wherein a plurality of stacked resin cultivating base having low and high density portions oriented in one direction are alternately arranged with the directions alternately crossed.

19. The resin cultivating base of any one of claim 1, wherein pipes generating bubbles are provided in a water flow space for the purpose of ventilating the water flow space.

* * * * *